United States Patent
Gasnier et al.

[19]

[11] Patent Number: 5,859,533
[45] Date of Patent: Jan. 12, 1999

[54] PROCESS FOR THE PRODUCTION OF A SUPPLY CURRENT OF A SOLENOID FOR A MEASURING PROBE FOR ELECTROMAGNETIC TOMOGRAPHY

[75] Inventors: Serge Gasnier, Orleans; Abderrahim Abdelhadi, Olivet, both of France

[73] Assignee: Oyo Corporation, Tokyo, Japan

[21] Appl. No.: 856,142

[22] Filed: May 14, 1997

Related U.S. Application Data

[62] Division of Ser. No. 532,928, Sep. 22, 1995, Pat. No. 5,650,726.

[30] Foreign Application Priority Data

Sep. 22, 1994 [FR] France .................................. 94 11325

[51] Int. Cl.⁶ ............................... G01V 3/10; G01V 3/28; H03K 3/00
[52] U.S. Cl. .................... 324/339; 324/228; 324/333; 324/335; 327/103; 327/110
[58] Field of Search .................................. 324/228, 232, 324/326, 329, 332–336, 338, 339; 327/101, 103, 110

[56] References Cited

U.S. PATENT DOCUMENTS

| | | | |
|---|---|---|---|
| 726,413 | 4/1903 | Ducretet | 336/146 X |
| 1,831,886 | 11/1931 | Ross | 336/147 X |
| 2,220,788 | 11/1940 | Lohman | 324/339 |
| 2,723,375 | 11/1955 | Schuster | 324/339 |
| 2,919,396 | 12/1959 | McLaughlin et al. | 324/335 |
| 4,748,415 | 5/1988 | Vail, III | 324/339 |
| 4,879,512 | 11/1989 | Leonard et al. . | |
| 4,965,522 | 10/1990 | Hazen et al. | 324/339 |
| 5,099,918 | 3/1992 | Bridges et al. . | |

FOREIGN PATENT DOCUMENTS

| | | |
|---|---|---|
| 1.107/478 | 1/1956 | France . |
| WO 94/01791 | 1/1994 | WIPO . |

*Primary Examiner*—Gerard R. Strecker
*Attorney, Agent, or Firm*—Young & Thompson

[57] ABSTRACT

An emitter for a system of electromagnetic tomographic measurements, as well as a process and a generator (5) adapted to produce a variable frequency current supplying a solenoid (1), constituted of turns wound about a magnetic core (3). The solenoid (1) is constituted by several windings (4a, 4b, 4c) disposed side by side with each other on the core (3), and the emitter comprises switching means (6) adapted to connect in series or in parallel and/or to disconnect the different windings (4a, 4b, 4c) with and from each other, constituting the solenoid (1), so as to control the number of active turns of the solenoid (1).

2 Claims, 3 Drawing Sheets

PROCESS FOR THE PRODUCTION OF A SUPPLY CURRENT OF A SOLENOID FOR A MEASURING PROBE FOR ELECTROMAGNETIC TOMOGRAPHY

This application is a division of application Ser. No. 08/532,928, filed Sep. 22, 1995, now U.S. Pat. No. 5,650,726, issued Jul. 22, 1997.

BACKGROUND OF THE INVENTION

The present invention relates to a process and apparatus for electromagnetic tomography and more precisely an emitter adapted to use such a process.

It is known that the technique of electromagnetic tomography consists in emitting, from an emitter ordinarily disposed in a subterranean cavity, and particularly a bore hole, a magnetic field of high value whose emitted radiation is detected by means of a receiver disposed in an adjacent region. On the one hand, upon varying the magnetic field, and on the other hand, by displacing the emitter and/or the receiver so as to cause the portion of the soil between these two elements to vary, it is possible to construct a map representing the nature of the soils existing between the emitter and the receiver.

The magnetic field emitters used in this type of technique are ordinarily constituted essentially by an alternating current generator supplying a solenoid with a magnetic core. The efficiency of such emitters is directly connected to the intensity of the magnetic field which they are adapted to produce. Moreover, the magnetic field produced by a solenoid traversed by a current is proportional to the product of the apparent permeability $\mu$ of its magnetic core, by the number N of its windings, by the cross section S of these latter and by the intensity I of the current which passes through it ($M=\mu.N.S.I$).

Under these circumstances, it is known in theory that the maximum magnetic field supplied by the emitter is obtained when each of these mentioned parameters has a maximum value.

The parameter of magnetic permeability $\mu$ is in direct relation to the nature of the material constituting the solenoid core, and its maximum value is correspondingly limited by the inherent nature of this material.

As to the current I, it is known that the value of this latter is rapidly limited, particularly because of the specific characteristics of the cables ensuring the supply of the emitter, and of the heating produced within the latter which, if it becomes too great, is likely to damage the circuits and the electric components used.

The cross section S of the windings constituting the solenoid and the number N of the latter are limited by the diameter of the cross section which it is desired to give to the emitter, which cross section is dictated by the small dimensions of certain bore holes.

Furthermore, the inherent principle of the tomographic methods used dictates that, for each of the relative positions of the emitter and the receiver, there is created a series of magnetic fields over a range of predetermined different frequencies. As a result, it is thus necessary that the magnetic field produced by the emitter maintains its power over all this range of frequencies.

Furthermore, it is interesting, particularly as to the time gain effected upon making the measurement, to work with multifrequencies, which is to say by generating a magnetic field at a base frequency and at harmonic frequencies which are odd or even. It is known that such a result is obtained by supplying the solenoid with a current whose signal shape is as close as possible to a square signal. The generators adapted to supply solenoids with current will therefore be able, in this embodiment, to be adapted to deliver such a square signal.

Moreover, the emitters used conventionally in the practice of electromagnetic tomographic processes are supplied with alternating current from the surface of the ground, via cables of great length. There results a certain number of substantial drawbacks.

In the first place, the inherent resistance of the cables and their great length lead to a marked drop of voltage in these, such that, if it is desired to avoid supplying only a low voltage to the emitter, it is necessary to provide an excessive level of supply voltage. However, the supply cables used do not always permit absorbing such a high voltage, particularly as it is then necessary to correspondingly over-dimension the cross section of these cables, which on the one hand raises the cost and on the other hand correspondingly increases the weight and size of the device.

Secondly, these supply cables carrying a low frequency alternating electric current are themselves a source of magnetic radiation, which disturbs the results of the measurement taken.

These various concerns are such that the emitters of the prior art in this field either are capable of emitting a magnetic field of sufficient power, but then have a large diameter such that this measurement technique can be used only in certain types of large diameter bore holes, or have diameters sufficiently small to permit their use in all types of bores, but the magnetic field that they produce is then too low for the measurement to be truly effective.

SUMMARY OF THE INVENTION

The present invention has for its object to overcome these drawbacks by providing an electromagnetic tomographic emitter adapted on the one hand to deliver, no matter what the supply frequency of its solenoid, a magnetic field of high value, sufficient to practice said process, and, on the other hand, having a sufficiently small diameter to permit it to be used in most bore holes. Moreover, the supply means of such an emitter are such that they give rise to no disturbance of the produced magnetic field.

The present invention thus has for its object an emitter for a system of electromagnetic tomography measurement, comprising a generator of variable frequency current supplying a solenoid, constituted by turns wound about a magnetic core, characterized in that said solenoid is constituted of several windings, disposed side by side on said core, and the emitter comprises switching means adapted to connect in series or in parallel and/or to disconnect the different windings to or from each other, constituting the solenoid, so as to control the number of active turns of the latter.

In another embodiment of the invention, the values of the inductance of each of these windings are chosen to have a geometric progression.

In another embodiment of the invention, the emitter comprises several condensers adapted to be mounted respectively in series with the different windings constituting the solenoid, so as to compensate the inductance effect of this latter and to permit the emitter to operate at regions adjacent resonance.

The present invention also has for its object a process for the production of a supply current for measuring probes for electromagnetic tomography, characterized in that it comprises the steps consisting in:

supplying said solenoid, at a voltage very much higher than that which would be applied to it to have it traversed by a current of the desired value, discontinuing the supply voltage when said desired value of the current is achieved, letting the current decrease until it reaches a threshold value, repeating the two preceding steps during a period of time substantially equal to half a desired period for the supply current of the solenoid, then reversing the direction of the supply voltage of the solenoid and repeating the preceding steps, so as to create an alternating current of the desired period whose signal is of substantially square shape.

BRIEF DESCRIPTION OF THE DRAWINGS

There will be described hereafter, by way of non-limiting example, an embodiment of the present invention, which reference to the accompanying drawing, in which.

DESCRIPTION OF THE PREFERRED EMBODIMENT

Figure 1:
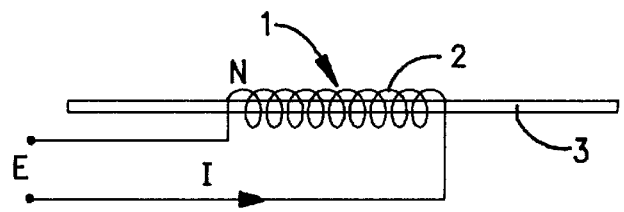
FIG. 1 is a diagram showing the principle of a solenoid of an emitter for a probe for electromagnetic tomographic measurement.

As mentioned above, and with reference to FIG. 1, the magnetic field M supplied by a solenoid 1 constituted by N windings 2 of cross section S wound on a core 3, formed by a linear rod of magnetic permeability $\mu$, and supplied by a current I under a voltage E is: $M=\mu.N.S.I$.

Figure 2:
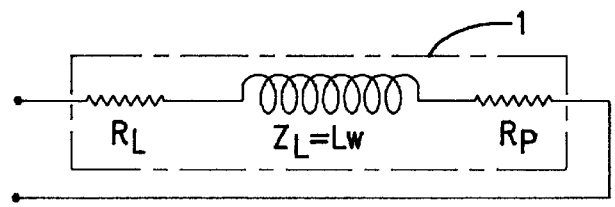
FIG. 2 is an electrical diagram equivalent to the diagram of the principle shown in FIG. 1.

Such a solenoid can be represented electrically by an equivalent (FIG. 2) constituted by a resistance $R_L$ representing the resistance of the solenoid 1, by an inductance L of impedance $Z_L=L\omega$ and by a resistance $R_P$, representing the losses in the magnetic core 3. The losses in said core 3 are, as a first approximation, equal to: $R_P=K.N^2.f^2$, in which f is the frequency of the electric current through the solenoid 1 and K is a constant depending on the nature and the dimensions of the core 3.

Under these conditions, the current passing through the solenoid 1 is: $I=E/(R_L+j\,L\omega+R_P)$ The magnetic field M produced is therefore:

$$M=\mu.N.S.E/(R_L+j\,L\omega+R_P)$$

Under these conditions, when the emitter operates in the low frequency region, the value of the losses $R_P$ is much less than the value of the resistance $R_L$ ($R_P<<R_L$), so that the term $R_P$ can be ignored and, thereafter, the magnetic field M produced is equal to:

$$M=\mu.N.S.E/(R_L+j\,L\omega)$$

When the emitter operates in the high frequency region, the losses $R_P$ in the magnetic core 3 become very much greater than the value of the resistance $R_L$ of the solenoid 1 ($R_P>>R_L$), so that this latter term can be ignored and, thereafter, the magnetic field M produced is equal to:

$$M=\mu.N.S.E/(R_P+j\,L\omega).$$

If the solenoid is tuned to resonance, the component $L\omega$ disappears, so that the magnetic field M is equal to:

$$M=\mu.S.E/K.N.f^2$$

Under these conditions, it will be seen that, to obtain an optimum magnetic field, it is important, at low frequencies, that the solenoid 1 be constituted by a large number N of turns 2, whilst at high frequencies, it is important that this same solenoid 1 then be constituted by the lowest number N possible of turns 2.

The present invention provides means permitting overcoming such a contradiction, by associating first means constituted by a solenoid formed of several windings which can be combined, with the aid of second means, or switching means, so that at high frequencies the number of windings constituting the solenoid 1 will be less than the number of windings of this solenoid when it is utilized at low frequencies.

Figure 3:
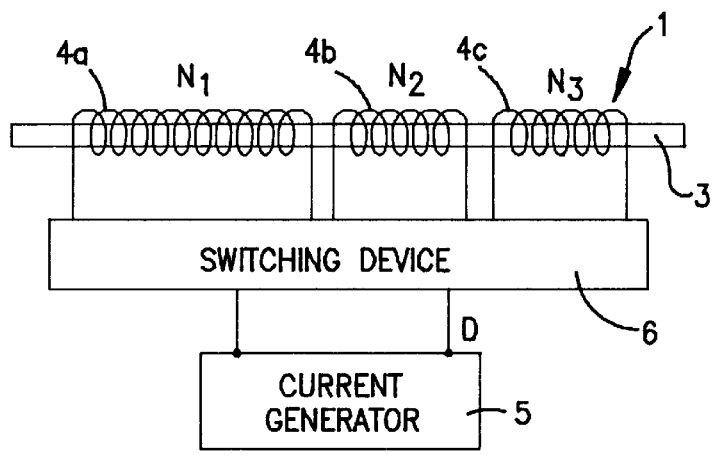
FIG. 3 is a diagram of an emitter for a measuring probe for electromagnetic tomography according to the invention.
Figure 4:
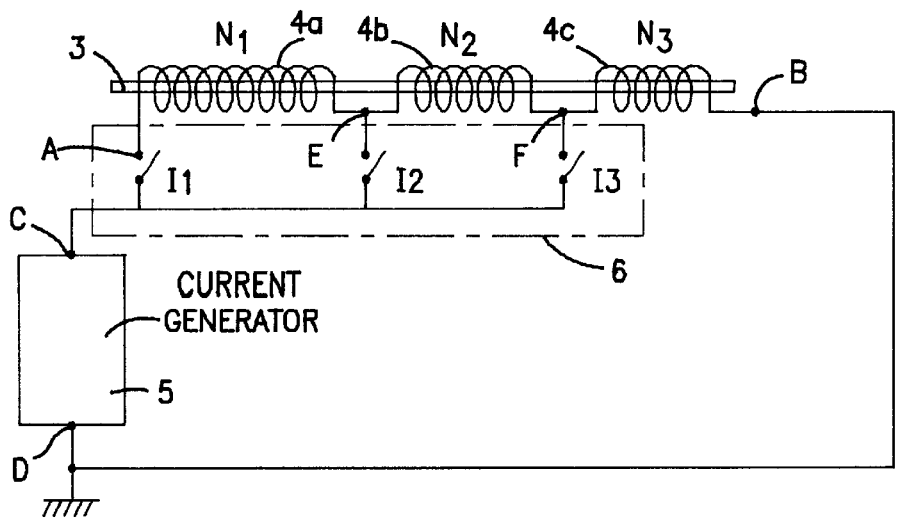
FIG. 4 is a detailed view of the emitter shown in FIG. 3.

There is shown in FIGS. 3 and 4 examples of embodiment of the present invention, in which a solenoid 1 is constituted by three windings 4a, 4b, 4c each comprising a number of turns respectively equal to $N_1=200$ turns, $N_2=150$ turns, and $N_3=100$ turns, which are respectively connected to a low frequency current generator 5, by means of switching means 6. The switching means 6 permit associating or not, in parallel or in series, as needed, which is to say as a function of the desired operating frequency, all or only a portion of the windings 4a, 4b, 4c so as to achieve a number $N_a$ of active turns (which is to say of turns through which current passes to produce the magnetic field M) near that determined to be optimum.

There is shown in FIG. 4 a first example of switching means 6 usable according to the invention. In this FIG. 4, the three windings 4a, 4b, 4c are interconnected in series at two points A and B. The solenoid 1 is supplied by two terminals C and D of the low frequency generator 5, whose frequency is adjustable, particularly between 4 Hz and 20 KHz. To this end, one of the terminals D of the generator 5 is connected to one of the ends B of the solenoid 1 and the other terminal C of this generator is connected to the other end A of said solenoid 1, by means of a switch $I_1$, and to respective connection points E and F of the windings 4a and 4b on the one hand, and 4b and 4c on the other hand, by means of two respective switches $I_2$ and $I_3$.

Thus, according to the invention, when it is desired to operate in the low frequency region, which is to say particularly between 4 Hz and 200 Hz, only the switch $I_1$ is closed, so that the number of active turns $N_a$ of the solenoid 1 is constituted by the sum of the turns $N_1$, $N_2$, $N_3$ of the windings 4a, 4b, 4c, which represents, in the present case, a number of active turns $N_a=450$ turns.

Conversely, when working in the high frequency region, which is to say between 10 kHz and 20 kHz, only the switch $I_3$ is closed, so that the number of active turns $N_a$ of the solenoid 1 is thereafter only $N_a=N_3=100$ turns. Closing of the switch $I_2$ permits operating in an intermediate frequency range, namely from 200 Hz to 10 kHz.

Figure 5:
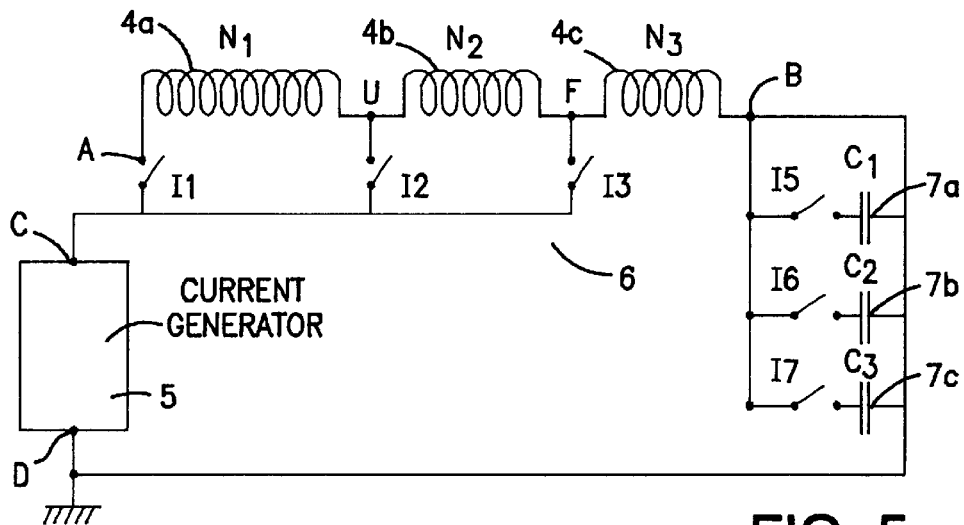
FIG. 5 is a view showing a modification of the embodiment of the emitter shown in FIGS. 3 and 4.

According to a modified embodiment of the invention, shown in FIG. 5, it will be noted that it may be wise, when leaving the low frequency range, which is to say particularly from about 200 Hz, to omit the inductive component, which is to say the component $L\omega$ of the windings utilized, by operating at resonance. To do this, there is inserted between the end B of the solenoid 1 and the terminal D of the generator 5, several condensers 7a, 7b, 7c, disposed in parallel and of respective values $C_1$=900nF, $C_2$=49.2nF and $C_3$=14.7nF. A switch $I_4$ for activating the condensers is disposed in series with the windings $N_1$, $N_2$ and $N_3$ and in parallel relative to the condensers 7a, 7b, 7c. Switches $I_5$, $I_6$, $I_7$ are respectively mounted in each of the shunts associated with each condenser 7a, 7b, 7c, so as to control, when they are closed, the actuation of the associated condenser. Under these conditions, when it is desired to actuate a given condenser, the switch $I_4$ is opened and the switch associated with the condenser that it is desired to select, is closed; in the contrary case, the switch $I_4$ is closed and the switches $I_5$, $I_6$, $I_7$ associated with the condensers $C_1$, $C_2$, $C_3$ are opened.

There is shown by way of example in the following TABLE, for different frequencies used, the value of the condensers and the switches controlling their actuation, which are in closed position.

TABLE

| Winding contacts | Number of turns (Na) | Contact condensers | Capacitance (nF) | Frequencies (Hz) |
|---|---|---|---|---|
| $I_1$ | 450 | $I_4$ | 0 | 4 to 150 |
| $I_1$ | 450 | $I_5$ | 900 | 560 |
| $I_2$ | 250 | $I_6$ | 49.2 | 4,480 |
| $I_3$ | 100 | $I_7$ | 14.7 | 17,920 |

As mentioned above, the supply current generator 5 is preferably adapted to deliver a square voltage, so as to permit, in the low frequency range, multifrequency operation, which is to say to permit the emitter to emit both a magnetic field at a given fundamental frequency, but also at even or uneven harmonic frequencies of this latter.

The current generator ensuring supply of the solenoid must be adapted to operate without a large part of its power dissipated in the form of heat. Thus, because of the particular operating conditions of these emitters, and particularly the environmental conditions (susceptible of being buried deeply underground, in a region in which the temperature is elevated) any heat rise within the interior of these latter carries the risk of becoming rapidly critical and thus leading to destruction by heating of the components used.

Under these conditions, it will be understood that, instead of conventional generators, which dissipate a large part of their power by the Joule effect, it is preferred to use generators of the cut-off type. However, these latter are difficult to use for such a type of application because of their large response times.

Figure 6:
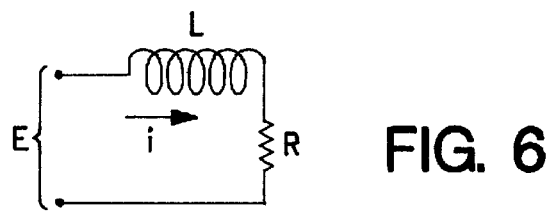
FIG. 6 is a schematic showing the principle of supply of an RL circuit.
Figure 7:
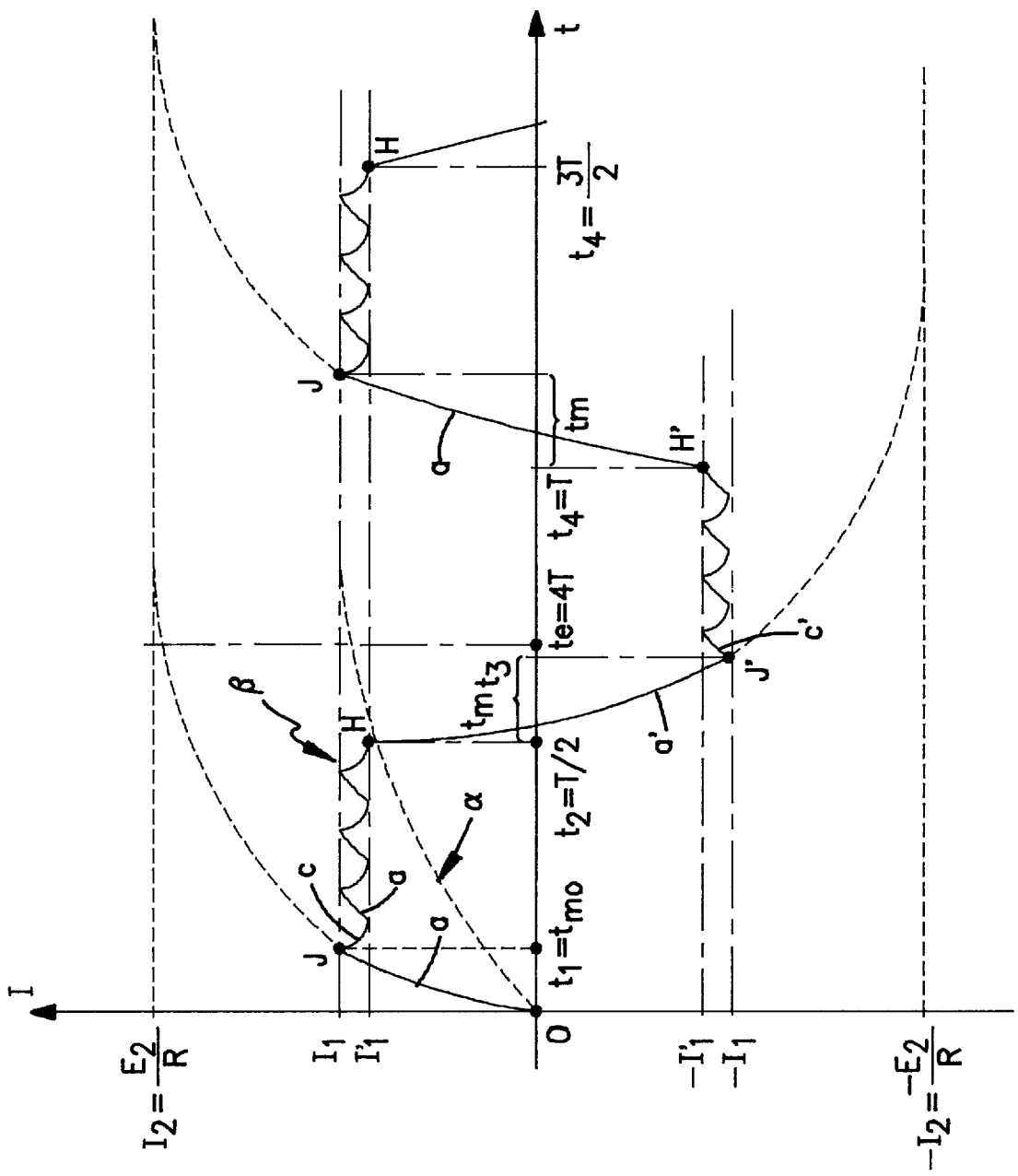
FIG. 7 is a graphical illustration of the principle of operation of a supply current generator of the emitter according to the invention.

Thus, as illustrated in FIGS. 6 and 7, it is known that the current i in the circuit RL, which is to say a circuit constituted by a resistance of value R and an inductance of value L, supplied by a voltage E, increases exponentially as a function of time (curve $\alpha$ in FIG. 7) according to the rule:

$i=(i_o-E)e^{-t/\tau}+E$ in which $i_o$ is the initial current and $\tau$ is the time constant: $\tau=L/R$ which represents the time at the beginning of which is achieved 63% of the value of the current.

As a practical matter, it will be noted that 98% of the desired value of the current $I_1=E_1/R$ is reached at the beginning of the time of establishment $t_e$ equal to $4\tau$ which, in the case of an inductance L of 400 mH and a resistance R of 10 Ω is of the order of 0.16 s. It will be readily understood that, under these conditions, because of the value of this establishment time $t_e$, such a supply arrangement cannot be used if it is desired to operate at relatively high frequencies, of the order of magnitude of those used according to the present invention.

So as to reduce the value of the time constant $\tau$ to decrease the establishment time $t_e$, the value of L can theoretically be reduced and the value of R increased, but that is difficult to do as a practical matter, to the extent to which the value of the inductance L is determined by construction and to which an increase of the value of the resistance R would give rise to an increase also of the supply voltage which would have the drawbacks mentioned above.

A first means provided by the present invention, and which is described hereinafter with respect to FIG. 7, consists in supplying the circuit with a voltage $E_2$ very much greater than the voltage $E_1$ which would be necessary to establish in the solenoid 1 the current $I_1$ of desired intensity, so that the time $t_{mo}$, or increased time, necessary for the current i to reach the desired value $I_1$ is very much less than the establishment time $t_e$ (portion a of the curve $\beta$). Once the desired current $I_1$ is reached (point J), regulation means cut the supply voltage of value $E_2$, so that the intensity of current i thereafter decreases according to said exponential law (portion c of the curve $\beta$), to reach a threshold value $I'_1$. Thereafter the regulation means reestablish the supply voltage of value $E_2$ and the current intensity i increases according to the same exponential law (portion a of the curve $\beta$), and the cycle of cutting and reestablishing the current i proceeds in that way for a period of time equal to half the period T of the current which it is desired to apply to the solenoid 1.

A second means provided by the present invention is employed at the time $t_2=T/2$, as soon as the current i reaches the threshold value $I'_1$ (point H on the curve $\beta$ of FIG. 7). According to the invention, at this time, the regulation means reverse the polarity of the supply voltage $E_2$, so that the latter thereafter has the value $-E_2$. Under these conditions the current intensity which, at time $t_2$ has the value $I'_1$ will decrease in relative value (curve a') to reach, at time $t_3$ the value $-I_1$ (point J' on the curve). As before, regulation means then cut the supply current, so that the current i increases in relative value in an exponential manner (curve c') to reach the threshold value $-I'_1$. The process repeats until time $t_4=T$ at which the regulation means again reverse the polarity of the supply voltage, so that this latter takes the value $E_2$. After the half period of operation, at which the increase time is $t_{mo}$ the cycle proceeds, with increase times $t_m$.

Because of the very short increase times $t_m$ of the current i, the present supply permits working at relatively high frequencies. The invention also permits generating substantially rectangular signals, which permit emitting magnetic fields M at a given fundamental frequency, as well as at frequencies harmonic to this latter.

Figure 8:
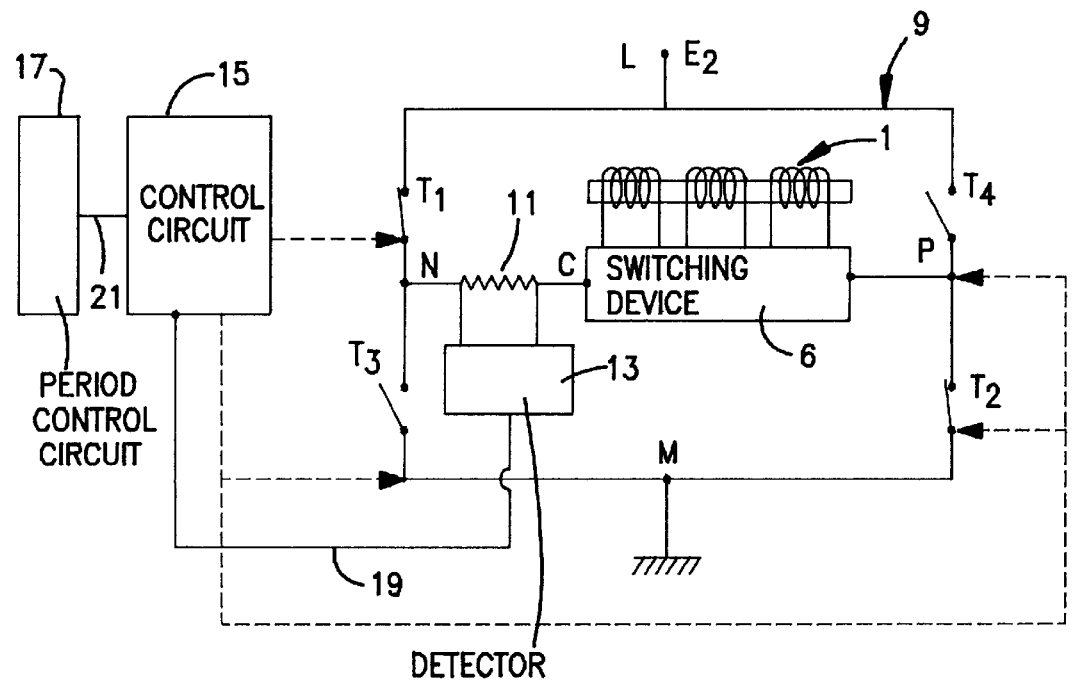
FIG. 8 is an electrical diagram of an example of embodiment of an emitter according to the invention.

There is shown in FIG. 8 a diagram of the principle of the electronic circuit of a current generator operating as described above.

The circuit is essentially constituted by a bridge 9, between terminals L and M to which is applied the supply voltage $E_2$. Each of the four legs of this bridge, namely LN, MP, NM, LP comprises respectively a switching transistor $T_1$, $T_2$, $T_3$, $T_4$. The central leg NP of the bridge 9 receives, between the terminals N and P. switching means 6 for the solenoid 1, and a measuring shunt 11. The switching transistors T1, T2, T3, T4 are energized by control means. These control means are constituted by a detector circuit 13 for high and low thresholds, by a control circuit 15 and by a period control circuit 17.

The threshold detector circuit 13 is in parallel to the terminals of the shunt 11, so that it detects a signal proportional to the current i which passes through the solenoid 1. When this current i reaches the threshold value $I'_1$ or the desired value $I_1$, or a peak value, it emits respective peak and threshold values which it sends via a line 19 to the regulation circuit 15. This latter then acts on the transistor T1 or T4 of the upper leg (for example) which is conductive, to render it non-conductive, so as to cut off the voltage supply $E_2$, in the case of the detection of a peak value $I_1$ or, on the contrary, to reestablish the voltage $E_2$ in the case of detection of a threshold value $I'_1$, by rendering conductive said transistor.

Moreover, the regulation circuit 15 is connected to the period control circuit 17 by a line 21, which permits, each time the intensity i reaches a threshold value $I'_1$ or $-I'_1$, verifying whether the waveform JK has or has not reached a half period T/2. If such is the case, the regulation circuit 15 acts on the transistors T1, T2, T3, T4, to effect reversal of the direction of the applied voltage $E_2$, by reversing their respective conductive conditions.

Such an electronic circuit permits building a current generator adapted to deliver a square signal of sufficiently high frequency to permit the performance of an electromagnetic tomographic process, this current generator dissipating only small energy by the Joule effect.

We claim:

1. Process for the production of a supply current of a solenoid (1) for a measuring probe for electromagnetic tomography, comprising the steps of:

supplying said solenoid (1) with a voltage ($E_2$) very much greater than the voltage ($E_1$) which would be applied to the solenoid (1) so that the solenoid (1) would be traversed by a current ($I_1$) of desired value, cutting the supply voltage ($E_2$) as soon as said desired value ($I_1$) of current is reached, letting the current (i) decrease until it reaches a threshold value ($I'_1$), repeating the preceding steps for a period substantially equal to approximately half a desired period (T) for the current supply of the solenoid (1), then reversing the direction of the supply voltage ($E_2$) of the solenoid (1), and repeating the preceding steps, so as to create an alternating current of the desired period (T), whose signal is of substantially square shape.

2. Current generator for an emitter of an electromagnetic tomographic system, comprising a solenoid (1) and:

supply means for the solenoid (1) adapted to establish at terminals of the solenoid (1) a voltage ($E_2$) very much greater than the voltage ($E_1$) which would be applied to the solenoid (1) so that the solenoid (1) would carry a current ($I_1$) of the desired value, regulation means adapted to cut off the supply current ($E_2$) as soon as the desired value ($I_1$) of the current is reached, and to maintain the current cut off as long as the current does not reach a threshold value ($I'_1$), means for time measurement adapted to measure the elapsed time from the establishment of the voltage ($E_2$), and to compare said elapsed time to the value of the half period (T/2) at which it is desired that the generator deliver the current, reversing means adapted to reverse the direction of establishment of the supply voltage ($E_2$) when said elapsed time reaches said value of the half period (T/2), the regulation means being adapted again to supply the solenoid (1) with current if said elapsed time is less than said half-period value.

* * * * *